(12) United States Patent
Pijlman et al.

(10) Patent No.: US 8,567,977 B2
(45) Date of Patent: Oct. 29, 2013

(54) ILLUMINATION SYSTEM AND DISPLAY DEVICE

(75) Inventors: Fetze Pijlman, Eindhoven (NL); Giovanni Cennini, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 412 days.

(21) Appl. No.: 12/527,915

(22) PCT Filed: Feb. 20, 2008

(86) PCT No.: PCT/IB2008/050600
§ 371 (c)(1),
(2), (4) Date: Aug. 20, 2009

(87) PCT Pub. No.: WO2008/104901
PCT Pub. Date: Sep. 4, 2008

(65) Prior Publication Data
US 2010/0091519 A1 Apr. 15, 2010

(51) Int. Cl.
*G09F 13/04* (2006.01)
(52) U.S. Cl.
USPC .......... 362/97.1; 362/97.2; 362/97.3; 349/61; 349/62; 349/63; 349/64
(58) Field of Classification Search
USPC .............................. 362/97.1–97.3; 349/61–64
See application file for complete search history.

(56) References Cited

U.S. PATENT DOCUMENTS

| | | | |
|---|---|---|---|
| 5,748,828 A | 5/1998 | Steiner et al. | |
| 5,914,760 A * | 6/1999 | Daiku | 349/65 |
| 6,011,602 A * | 1/2000 | Miyashita et al. | 349/65 |
| 6,547,408 B1 | 4/2003 | Greiner | |
| 6,876,408 B2 * | 4/2005 | Yamaguchi | 349/57 |
| 2001/0030638 A1 | 10/2001 | Kashima | |
| 2004/0174706 A1 | 9/2004 | Kan | |
| 2005/0157518 A1 | 7/2005 | Kazuhiro et al. | |
| 2006/0050510 A1 | 3/2006 | Ikeda et al. | |
| 2006/0187651 A1 | 8/2006 | Kim et al. | |
| 2006/0203517 A1 | 9/2006 | Kang et al. | |
| 2007/0030414 A1 * | 2/2007 | Chang | 349/62 |
| 2007/0109766 A1 * | 5/2007 | Kodama et al. | 362/97 |

FOREIGN PATENT DOCUMENTS

| | | |
|---|---|---|
| WO | 9833007 A1 | 7/1998 |
| WO | 2005085916 A1 | 9/2005 |

\* cited by examiner

*Primary Examiner* — Sean Gramling
(74) *Attorney, Agent, or Firm* — Mark L. Beloborodov (57) ABSTRACT

The invention relates to an illumination system (30) for illuminating a display (20) of a display device (10), and to a display device. The illumination system comprises a light source (S1, S2, S3) and an optical control layer (40). The light source emits light via the optical control layer to the display for illuminating a predefined area (A1, A2, A3) on the display. The light is emitted from the light source in a diverging beam in a particular direction (O1, O2, O3) towards the predefined area. The optical control layer comprises an arrangement of portions (46) having a refractive index which is different from the optical control layer. The portions are arranged to reflect a part of the diverging light towards the predefined area. The measures according to the invention have the effect that the arrangement of portions in the optical control layer confines both the light emitted by the light source and the backscattered light reflected back to the light source to substantially within the predefined area.

14 Claims, 7 Drawing Sheets

ILLUMINATION SYSTEM AND DISPLAY DEVICE

FIELD OF THE INVENTION

The invention relates to an illumination system for illuminating a display.

The invention also relates to a display device.

BACKGROUND OF THE INVENTION

Illumination systems for illuminating display devices are known per se. They are used, inter alia, as backlighting systems in non-emissive displays, such as liquid crystal display devices, also referred to as LCD panels, which are used in, for example, television receivers, (computer) monitors, (cordless) telephones and PDAs. These illumination systems can also be used in, for example, projection systems such as a digital projectors, also referred to as beamers, for projecting images or displaying television programs, films, video programs or DVDs, or the like.

To reduce motion blur in display devices, the known illumination systems comprise an array of light sources which can be operated in a scanning backlight mode of operation. To enable the scanning backlight mode, the array of light sources in the known illumination system is segmented so as to enable parts of the display to be illuminated selectively. Alternatively, selective illumination may be used in the known illumination systems, for example, in a dimmable backlight mode of operation so as to enhance the contrast of the display device. The luminance of each particular light source in the array of light sources may be adapted (for example, dimmed), depending on a luminance content of a part of the image illuminated by the particular light source.

US 2004/0174706 discloses an optical illumination system with which a direction of emission of the light emitted by light-emitting devices can be influenced. The optical system comprises a plurality of light-emitting devices which have a wide beam spread and are spatially arranged in an array. An embodiment of the optical system includes a plurality of horizontal planar reflective optics arranged adjacent to the rows of light-emitting devices. The horizontal reflective optics provide a moderate off-axis distribution of the illumination in a vertical direction and a wide beam spread in a horizontal direction. In this way, the known illumination system is segmented so as to selectively illuminate part of the display.

The known illumination system has the drawback that the reflective optics typically cause brightness differences within the segmented area.

OBJECT AND SUMMARY OF THE INVENTION

It is an object of the invention to provide a locally confined illumination system having reduced brightness differences.

According to a first aspect of the invention, the object is achieved with an illumination system comprising a light source and an optical control layer, the light source being arranged to emit light via the optical control layer towards the display, the light from the light source being emitted in a diverging beam in a particular direction towards a predefined area on the display, the optical control layer being a translucent layer comprising an arrangement of portions having a refractive index which is different from the optical control layer for reflecting part of the diverging light back towards the predefined area.

The illumination system according to the invention has the effect that the arrangement of portions in the optical control layer confines the light emitted by the light source substantially within the predefined area by reflecting a part of the light which propagates away from the predefined area back towards the predefined area. A number of portions arranged over the optical control layer and/or a distribution of the portions over the optical control layer and/or a dimension of the portions substantially perpendicular to the optical control layer may be varied to control a distribution of the light away from the particular direction so as to substantially impinge on the predefined area. In the known illumination system, planar reflective optics are arranged adjacent to the rows of light-emitting devices for controlling the emitted light to substantially remain within the predefined area. The planar reflective optics are arranged in such a way that light which is emitted by the light source and would impinge on the display device outside the predefined area will be reflected back to the predefined area. This reflection from the reflective optics generally causes a non-uniform light distribution over the predefined area. By applying the optical control layer according to the invention between the light source and the display, the arrangement of portions in the optical control layer control the emitted light, such that light propagating away from the particular direction is reflected back to the predefined area. By using a plurality of portions for controlling the emitted light, non-uniformity due to reflection from each portion is averaged over the plurality of portions resulting in a more uniform distribution of the light on the predefined area. Furthermore, the distribution of the arrangement of portions may be adapted to further improve the uniformity of the light distribution on the predefined area. In so choosing an arrangement of the plurality of portions in the optical control layer, the optical control layer controls the emitted light from the light source to substantially illuminate the predefined area, and controls the uniformity of the light over the predefined area.

A further advantage when using the optical control layer according to the invention is that it also controls part of the backscattered light to be substantially scattered back towards the light source. Backscattered light is, for example, reflected or scattered from the display or, for example, from a further layer arranged between the display and the illumination system. The arrangement of portions in the optical control layer also reflects part of the backscattered light which is scattered away from a particular axis parallel to the particular direction back towards the particular axis. Due to the arrangement of portions in the optical control layer, part of the backscattered light reflects back towards the light source and may be re-used, for example, via reflection for illuminating the predefined area. In the known illumination system, a major part of the backscattered light is scattered towards a further light source, for example, arranged adjacent to the light source. Subsequently, the backscattered light is reflected in the further light source back towards the display, generally illuminating a further predefined area different from the predefined area. In the known illumination system used in for example, the scanning backlight mode of operation, the backscattered light generally decreases the reduction of motion blur. In the known illumination system used in, for example, the dimmable backlight mode of operation, the backscattered light generally reduces the increase of contrast. The illumination system according to the invention comprises the optical control layer arranged between the display and the light source. The optical control layer also reflects part of the backscattered light back to the particular axis, such that the part of the backscattered light after reflection in the light source also illuminates the predefined area. Consequently, the optical control layer in the illumination system according to the invention used in, for example, a scanning backlight mode of operation contributes to the reduction of motion blur. The optical control layer in the illumination system according to the invention used in, for example, a dimmable backlight mode of operation contributes to the increase of contrast.

Alternatively, the arrangement of portions in the optical control layer may be used to generate a predefined overlap between the predefined area of the light source and the further predefined area of the further light source.

In an embodiment of the illumination system, the portions comprise walls arranged substantially parallel to the particular direction. This embodiment has the advantage that the use of walls arranged substantially parallel to the particular direction allows an angular distribution of the light emitted by the light source to be preserved. Such portions have, for example, a substantially rectangular cross-section. In an illumination system for display devices, light sources having a relatively wide beam spread are preferably used to obtain a relatively large viewing angle of the image displayed on the display. This relatively wide beam spread should ideally be maintained throughout the optical system. By using portions having walls arranged substantially parallel to the particular direction, the light emitted by the light source is controlled to substantially illuminate the predefined area, while the angular distribution of the light emitted by the light source is substantially preserved.

In an embodiment of the illumination system, a pitch between the portions is of the same order of magnitude as or smaller than a height of the portions, the height of the portion being a dimension of the portion in a direction substantially perpendicular to the optical control layer, the pitch being defined in a direction substantially parallel to the optical control layer. This embodiment has the advantage that the light will have several reflections inside the optical control layer between two neighboring portions, which enhances the confinement of the light to within the predefined area and as such enhances the desired effect of the optical control layer. A pitch having the same order of magnitude as the height of the portions includes pitches which are larger than the height of the portions, such as a pitch being four times larger than the height of the portions, or a pitch being six times larger than the height of the portions.

In an embodiment of the illumination system, a pitch between the portions varies over the optical control layer, the pitch being defined in a direction substantially parallel to the optical control layer. This embodiment has the advantage that the pitch between the portions may be varied to obtain a substantially uniform illumination of the predefined area by the light source.

In an embodiment of the illumination system, the height of the portions varies over the optical control layer. For example, the height increases near the transition from one predefined area to a further predefined area, which results in a relatively strong confinement of the light emitted by the light source to the predefined area.

In an embodiment of the illumination system, the portions comprise grooves in the optical control layer. This embodiment has the advantage that the grooves may be applied relatively cost-effectively by using, for example, well-known etching or stamping processes.

In an embodiment of the illumination system, the grooves are generated at a side of the optical control layer facing away from the light source, and/or wherein the grooves are generated at a side of the optical control layer facing the light source.

In an embodiment of the illumination system, the optical control layer comprising the portions is a diffuser layer comprising the portions. This embodiment has the advantage that the combination of the optical control layer and the diffuser allows a reduction of components that are necessary to generate a good image on a display, which generally reduces costs of the display device.

In an embodiment of the illumination system, the portions are arranged in substantially straight lines substantially parallel to the optical control layer. This embodiment has the advantage that the portions arranged in substantially straight lines parallel to the optical control layer can be easily used in a one-dimensional array of light sources. The arrangement of portions arranged in substantially straight lines may be used to confine the light emitted by two neighboring light sources to substantially within their respective predefined areas. Alternatively, the arrangement of portions arranged in substantially straight lines may be used to control a predefined overlap between the predefined area of a light source and the further predefined area of a further light source. This embodiment has the further advantage that the arrangement of portions arranged in substantially straight lines renders the optical control layer relatively insensitive to translation of the optical control layer in a direction parallel to the straight lines. This simplifies the application of the optical control layer in the illumination system according to the invention.

In an embodiment of the illumination system, the portions are arranged in curved lines extending substantially parallel to the optical control layer and being arranged around the particular direction. This embodiment has the advantage that it allows confinement of the light emitted by the light source in a predefined area having substantially any shape.

In a further embodiment of the illumination system, a part of the portions is arranged in lines extending substantially parallel to the optical control layer, the lines having a random shape, random length and/or being substantially randomly distributed on the optical control layer. When a part of the portions is substantially randomly shaped and/or distributed, this part of the portions may improve a uniformity of the illumination of the predefined area by the light source, because light reflecting from these randomly shaped and/or distributed portions is substantially randomly distributed across the display.

An embodiment of the illumination system comprises a further optical control layer having portions, the further optical control layer being arranged substantially parallel to the optical control layer, the portions being arranged in further lines extending substantially parallel to the further optical control layer and being arranged substantially perpendicularly to the lines of the optical control layer. This embodiment has the advantage that the combination of the optical control layer and the further optical control layer allows a two-dimensional confinement of the light emitted by the light source to substantially within the predefined area.

A further embodiment of the illumination system comprises a plurality of light sources arranged to emit light via the optical control layer towards the display, each particular light source being arranged to illuminate a particular predefined area on the display, wherein the optical control layer comprises an arrangement of portions for reflecting part of the diverging light of each particular light source back towards the corresponding particular predefined area. This embodiment is especially advantageous in an illumination system for use in a scanning or in a dimmable backlight mode of operation.

In an embodiment of the illumination system, each light source of the plurality of light sources comprises a light-emitting diode, or a low-pressure vapor discharge lamp, or a laser light source.

In an embodiment of the illumination system, the particular direction corresponds to an optical axis of the light source.

The invention also relates to a display device comprising the illumination system according to the invention, and a display.

BRIEF DESCRIPTION OF THE DRAWINGS

These and other aspects of the invention are apparent from and will be elucidated with reference to the embodiments described hereinafter.

In the drawings.

The Figures are purely diagrammatic and not drawn to scale. Particularly for clarity, some dimensions are exaggerated strongly. Similar components in the Figures are denoted by the same reference numerals as much as possible.

DESCRIPTION OF EMBODIMENTS

Figure 1A:
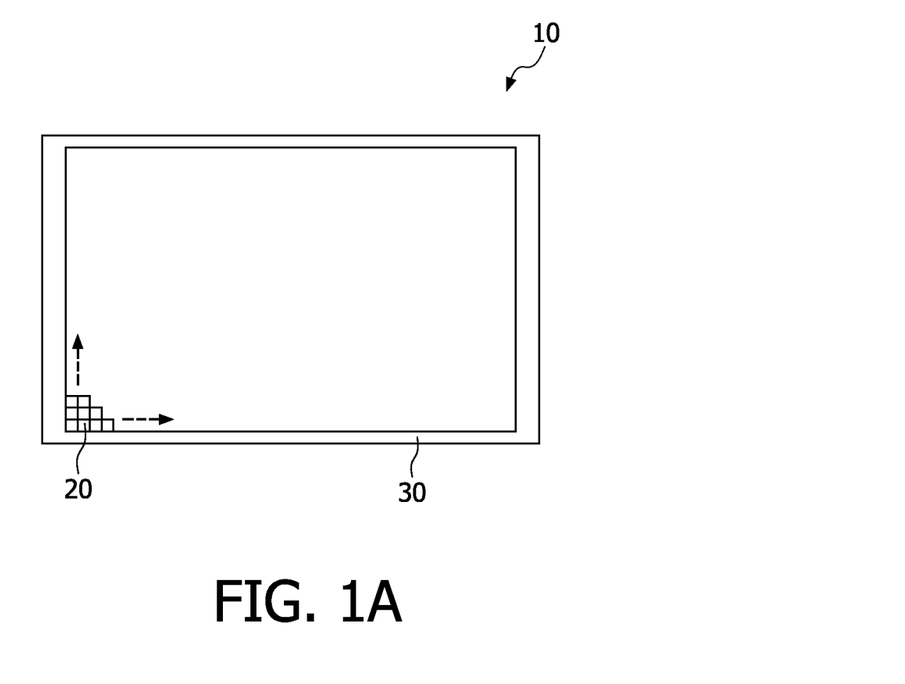
FIG. 1A is a schematic front view of a display device according to the invention.

FIG. 1A is a schematic front view of a display device 10 according to the invention. The display device 10 comprises an illumination system 30 and a display 20. The illumination system 30 is arranged to illuminate the display 20. The display 20 is, for example, a known non-emissive display which comprises a plurality of pixels (indicated by the array of squares). Each pixel is arranged to control a transmission of the light emitted by a light source through the pixel, and as such controls a luminance emitted by the pixel. Choosing the transmittance of the different pixels enables an image to be displayed on the display 20. The pixels typically comprise a plurality of sub-pixels (not shown) having different color filters (not shown) and as such they control the transmission of the light of a predefined color and thus enable a color-image to be displayed on the display 20.

Figure 1B:
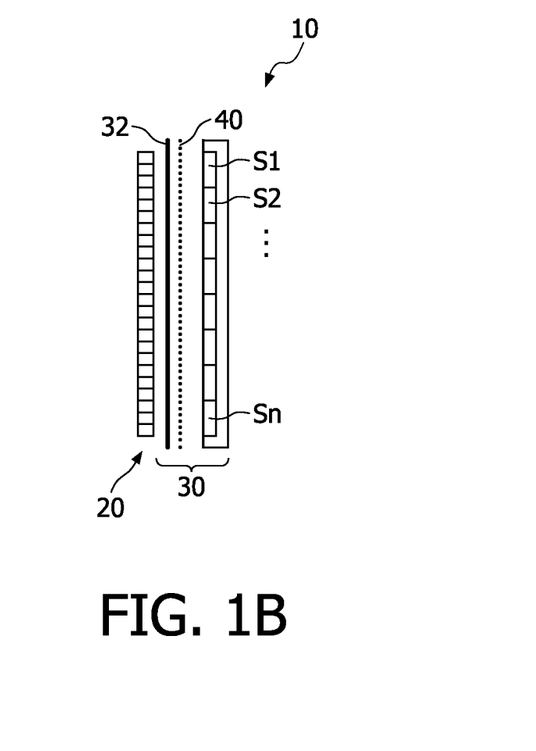
FIG. 1B is a schematic cross-sectional view of a display device according to the invention.

FIG. 1B is a schematic cross-sectional view of a display device 10 according to the invention. The display device 10 comprises an illumination system 30. The illumination system 30 has a plurality of light sources S1, S2, . . . , Sn, and an optical control layer 40 for controlling the light emitted by the light sources S1, S2, . . . , Sn. The illumination system may also comprise other optical elements, such as, for example, one or more diffuser layers 32 for increasing a uniformity of the light emitted by the light sources S1, S2, . . . , Sn via the optical control layer 40 to the display 20. The one or more diffuser layers 32 may be arranged between the display 20 and the optical control layer 40 and/or between the optical control layer 40 and the plurality of light sources S1, S2, . . . , Sn. Each particular light source S1; S2; . . . ; Sn is arranged to illuminate a particular predefined area A1, A2, A3 (see FIG. 2) on the display 20. The optical control layer 40 comprises an arrangement of portions 46 (see FIG. 2) for controlling the light emitted by each particular light source S1; S2; . . . ; Sn so as to substantially illuminate the corresponding particular predefined area A1, A2, A3. The illumination system 30 comprising the plurality of light sources S1, S2, . . . , Sn can be used advantageously in a scanning or in a dimmable mode of operation, both well known to a person skilled in the art. Alternatively, the plurality of light sources S1, S2, . . . , Sn can also be used in a continuous mode of operation.

In FIG. 1B, the optical control layer 40 is indicated as a separate layer arranged in the illumination system 30. Alternatively, the optical control layer 40 may be applied, for example, on a diffuser layer 32 or on another layer arranged in the illumination system 30, for example, on a light-exit surface (not shown) of a light guide (not shown), or, for example, on a brightness enhancement layer (not shown) well known to the person skilled in the art. The optical control layer 40 may also be embedded in a layer, for example, sandwiched between two diffuser layers 32.

Figure 2:
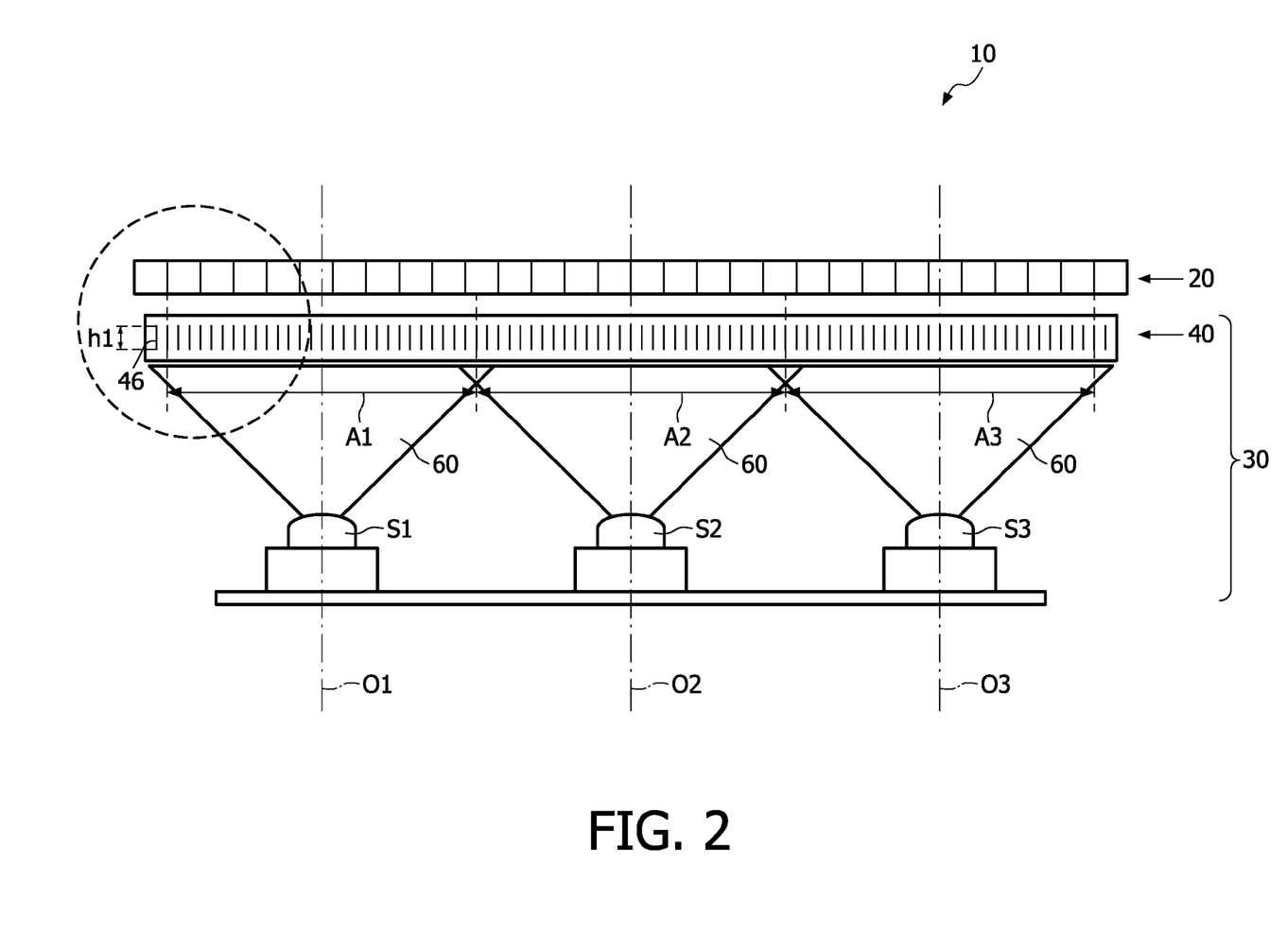
FIG. 2 is a detailed schematic cross-sectional view of the display device according to the invention, having a plurality of light sources.

FIG. 2 is a detailed schematic cross-sectional view of the display device 10 according to the invention, having the plurality of light sources S1, S2, S3. Each light source S1; S2; S3 of the plurality of light sources S1, S2, S3 emits a diverging beam 60 in a particular direction O1, O2, O3 towards a predefined area A1, A2, A3 on the display 20. Between the display 20 and the light sources S1, S2, S3, the optical control layer 40 is arranged to control the light emitted by the light sources S1, S2, S3. The optical control layer 40 is a translucent layer consisting of a translucent material and comprises an arrangement of portions 46 having a refractive index which is different from that of the optical control layer 40. Due to the difference of refractive index between the portions 46 and the optical control layer 40, light propagating through the optical control layer 40 and impinging on a transition from the optical control layer 40 to a portion 46 may be reflected by the portion 46. The distribution of the light emitted by the light sources S1, S2, S3 across the predefined surface A1, A2, A3 can be controlled by choosing an appropriate arrangement and/or distribution of the portions 46 in the optical control layer 40. The optical control layer 40 may control the light emitted by the light source S1, S2, S3 to substantially illuminate the predefined area A1, A2, A3. In addition, the optical control layer 40 may control the uniformity of the light emitted by the light source S1, S2, S3 over the predefined area A1, A2, A3, for example, via distribution of the portions 46.

The optical control layer 40 according to the invention has the further advantage that it also controls part of the backscattered light 64 (see FIGS. 3A, 3B, and 3C) to be substantially scattered back towards the light source S1, S2, S3. Backscattered light 64 is, for example, reflected or scattered from the display 20 or, for example, from a further layer 32 (see FIG. 1B) arranged between the display 20 and the light sources S1, S2, S3. The arrangement of portions 46 in the optical control layer 40 also reflects part of the backscattered light 64 which is scattered away from a predefined axis O1, O2, O3 arranged parallel to the predefined direction O1, O2, O3 back towards the predefined axis O1, O2, O3. Due to the arrangement of portions 46 in the optical control layer 40, part of the backscattered light 64 reflects back into the light source S1, S2, S3 and may be re-used, for example, via reflection for illuminating the predefined area A1, A2, A3. The optical control layer 40 according to the invention thus substantially confines light directly emitted by the light sources S1, S2, S3 to the predefined area A1, A2, A3, controls a uniformity of the illumination of the predefined area A1, A2, A3 due to the arrangement and/or distribution of the portions 46, and substantially confines part of the backscattered light 64 to substantially within the predefined area A1, A2, A3.

The portions 46 may contain, for example, air or, for example, a further translucent material having a different refractive index as compared to the translucent material of the optical control layer 40. Alternatively, the portions 46 may contain, for example, metal or a metal coating for reflecting the light.

As can be seen from the embodiment shown in FIG. 2, the portions may be arranged substantially parallel to the particular direction O1, O2, O3. All portions 46 shown in the embodiment of FIG. 2 have substantially the same height h1, which is a dimension parallel to the particular direction O1, O2, O3. Alternatively, the height h1 of the portions 46 may vary; for example, the height h1 may be larger near an edge of a predefined surface A1, A2, A3 and smaller near an intersection between the particular direction O1, O2, O3 and the predefined surface A1, A2, A3. The height may have any value within a range of ten micrometers to approximately three millimeters. The portions 46 shown in FIG. 2 are arranged in a substantially regular pattern throughout the optical control layer 40. Alternatively, the distribution of the portions 46 in the optical control layer 40 may vary; for example, the portions may be arranged in a repetitive distribution arranged symmetrically around the particular direction O1, O2, O3.

Each predefined area A1; A2; A3 illuminated by the different light sources S1; S2; S3 may overlap. An extent of the overlap may be controlled, for example, via the optical control layer 40. If the predefined areas do not overlap, a viewer looking at the display 20, for example, at a specific angle with respect to a normal of the display 20 may see bright or dark areas (not shown) that result from the illumination system 30. By defining some overlap, for example, via the optical control layer 40, this brightness variation across the display 20 may be reduced.

The light sources S1, S2, S3 shown in FIG. 2 are light-emitting diodes S1, S2, S3 for illuminating the display 20. Alternatively, low-pressure vapor discharge lamps or laser light sources may be used. Furthermore, each light source S1; S2; S3 may comprise a light-mixing chamber (not shown) for mixing the light emitted by the light source S1; S2; S3 before the light is emitted in a diverging beam 60 towards the display 20.

The particular direction O1, O2, O3 typically coincides with a particular axis O1, O2, O3 of each light source S1, S2, S3. For example, the particular direction O1, O2, O3 may coincide with the optical axis O1, O2, O3 of each light source S1, S2, S3, for example, when the light source S1, S2, S3 emits a rotationally symmetric diverging beam 60. Alternatively, the particular direction O1, O2, O3 may correspond to a symmetry surface O1, O2, O3, for example, when the light source S1, S2, S3 is a longitudinal light source S1, S2, S3, such as the low-pressure vapor discharge lamp S1, S2, S3.

Figure 3A:
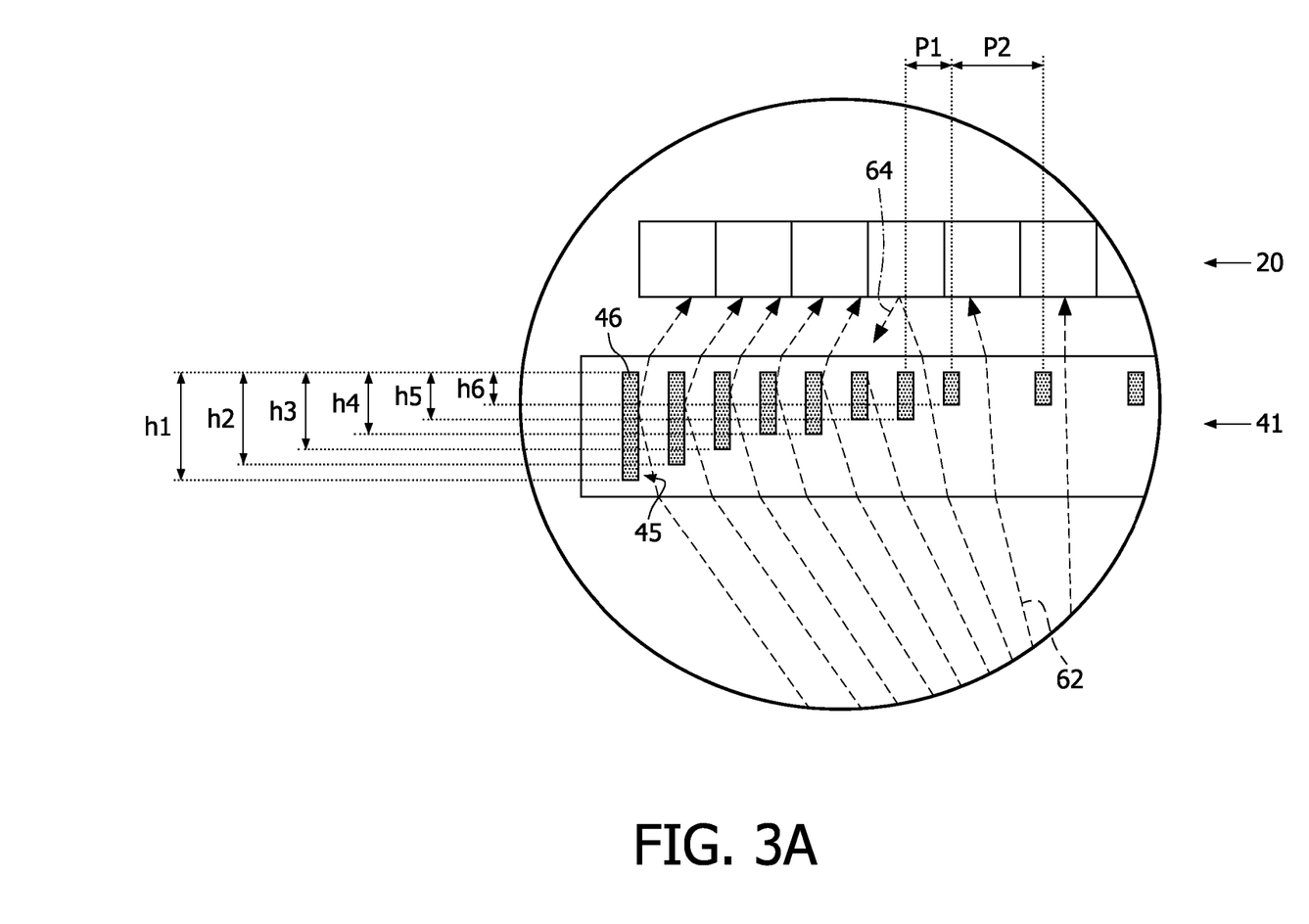
FIGS. 3A, 3B and 3C are further detailed schematic cross-sectional views of different embodiments of the optical control layer.
Figure 3B:
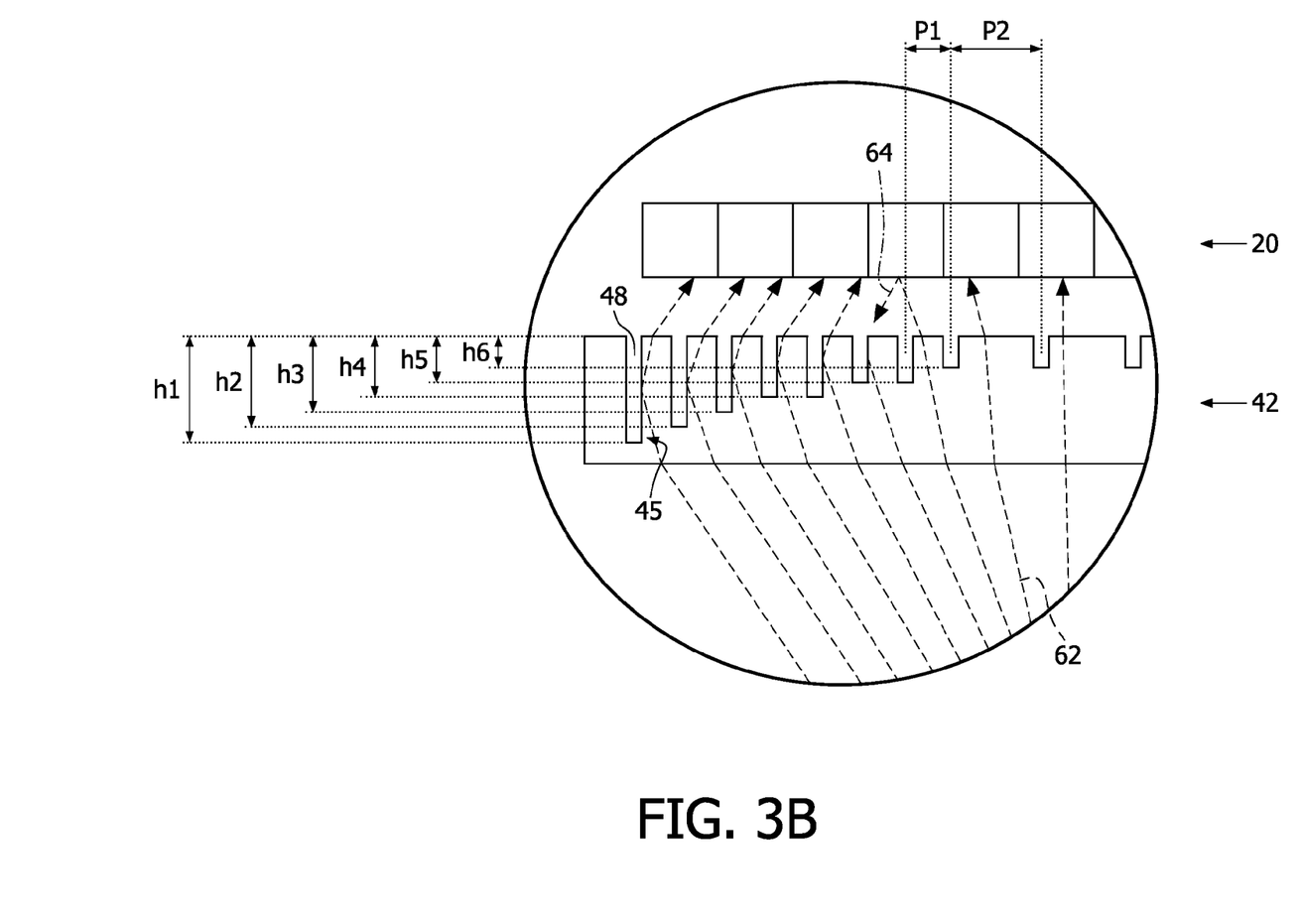
Figure 3C:
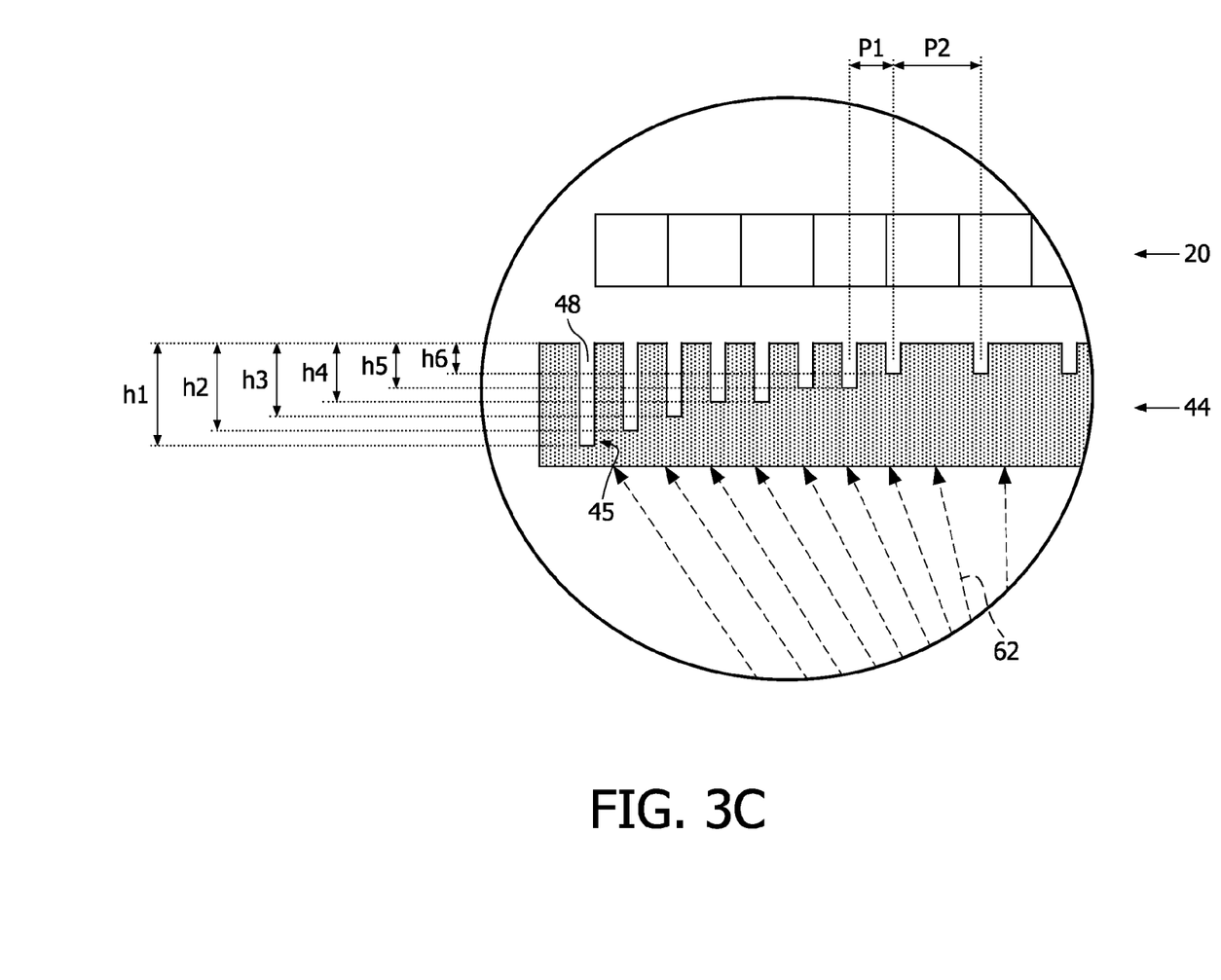

FIGS. 3A, 3B, and 3C are further detailed schematic cross-sectional views of different embodiments of the optical control layer 40, 41, 42, 44. The schematic cross-sectional views shown in FIGS. 3A, 3B, and 3C are detailed views of the broken-line circle shown in FIG. 2.

FIG. 3A shows a first embodiment of the optical control layer 41 according to the invention. The optical control layer 41 comprises an arrangement of portions 46 arranged inside the optical control layer 41. The height h1, h2, . . . , h6 of the portions 46 changes over the optical control layer 41. Near the edge of the predefined area A1, A2, A3 (see FIG. 2), the height h1, h2, . . . , h6 of the portions 46 increases. This increase in height h1, h2, . . . , h6 has the effect that it allows improved control of the light emitted by the light source S1, S2, S3 or backscattered 64, for example, from the display 20 to substantially illuminate the predefined area A1, A2, A3. The portions 46 shown in FIG. 3A have a substantially rectangular cross-section and consist of a material which is different from the translucent material of the optical control layer 41.

The broken-line arrows in FIG. 3A indicate rays 62 of light which jointly define the diverging beam 60 (see FIG. 2) of light emitted by the light source S1, S2, S3. As can be seen from FIG. 3A, the rays 62 typically impinge on a wall 45 at a relatively large angle of incidence (not indicated) with respect to a normal (not indicated) of the wall 45. Due to this relatively large angle of incidence, the rays 62 are reflected from the interface between the optical control layer 41 and the portions 46. As a result, part of the light propagating away from the particular axis O1, O2, O3 of the light source S1, S2, S3 is reflected by the portions 46 back to the particular axis O1, O2, O3 for controlling the emitted light to substantially remain within the predefined area A1, A2, A3. Near the particular axis O1, O2, O3 (located at a right part of FIG. 3A), the pitch P2 between two portions 46 is relatively large, while a height h6 of the portions 46 is relatively low. Since the light emitted by the light source S1, S2, S3 near the particular axis O1, O2, O3 already propagates substantially parallel to the particular axis O1, O2, O3, the arrangement of portions 46 does not need to control the light to substantially remain within the predefined area A1, A2, A3. Near the edge of the predefined area A1, A2, A3 (located at a left part of FIG. 3A), the pitch P1 between two portions 46 is relatively small, while a height h1 of the portions 46 is relatively high. This part of the light emitted by the light source S1, S2, S3, referred to as the off-axis part of the light, is typically controlled by the optical control layer 41 so as to ensure that the light substantially illuminates the predefined area A1, A2, A3. Furthermore, light emitted by the light source S1, S2, S3 and reflected from a layer arranged between the light source S1, S2, S3 and the display 20 may be reflected away from the light source S1, S2, S3, for example, towards a neighboring light source outside the predefined area A1, A2, A3. Near the edge of the predefined area A1, A2, A3, the reflected light must thus also be controlled to substantially illuminate the predefined area A1, A2, A3. Due to the reduced pitch P1 and the increased height h6 near the edge of the predefined area A1, A2, A3, both the light emitted by the light source S1, S2, S3 towards the display 20 and the backscattered light 64 from, for example, the display 20 are controlled. The light emitted from the light source S1, S2, S3 is substantially controlled to directly illuminate the predefined area A1, A2, A3. The backscattered light 64 is substantially controlled to be reflected towards the light source S1, S2, S3 and to be subsequently re-used via reflections in the light source S1, S2, S3 so as to also illuminate the predefined area A1, A2, A3.

A distance between two portions 46, also indicated as pitch P1, P2, may be of the same order of magnitude as the height h1, h2, . . . , h6 of the portions 46. This is illustrated in FIG. 3A by a relatively large pitch P2 indicated by P2 near the particular axis O1, O2, O3. The same order of magnitude includes pitches P1, P2 being larger than the height h1, h2, . . . , h6 of the portions 46, such as a pitch P1, P2 being five times larger than the height h1, h2, . . . , h6 of the portions 46, or a pitch P1, P2 being seven times larger than the height h1, h2, . . . , h6 of the portions 46. The pitch P1, P2 may also be smaller than the height h1, h2, . . . , h6 of the portions 46. This is illustrated in FIG. 3A by a relatively small pitch P1 indicated by P1 near the edge of the predefined area A1, A2, A3.

FIG. 3B shows a second embodiment of the optical control layer 42 according to the invention. The optical control layer 42 comprises a similar arrangement of portions 48 as shown in FIG. 3A. However, the portions 48 are now grooves having a substantially rectangular cross-section. The grooves 48 may be filled with air or a further material having a different refractive index as compared to that of the translucent material of the optical control layer 42. Again, the height h1, h2, . . . , h6 of the portions 48 and the pitch P1, P2 between the portions 48 change over the optical control layer 42, with substantially the same effect as indicated above (FIG. 3A). Use of grooves as portions 48 has the advantage that the grooves 48 can be made relatively easily by means of, for example, well-known etching or stamping techniques. This enables the optical control layer 42 to be produced cost-effectively.

FIG. 3C shows a third embodiment of the optical control layer 44 according to the invention. The optical control layer 44 again comprises grooves 48 arranged in a similar configuration as shown in FIG. 3B. However, a difference between the third embodiment shown in FIG. 3C and the second embodiment shown in FIG. 3B is that the translucent material of the optical control layer 44 consists of diffuser material (indicated by a grey color). The use of diffuser material as the translucent material of the optical control layer 44 allows a reduction of the complexity of the display device 10 so that it can be produced at reduced cost while maintaining substantially the same quality. Although the arrangement of grooves 48 is identical to the grooves 48 shown in FIG. 3B, the optimal distribution to obtain a required confinement of the light emitted by the light source S1, S2, S3 towards the display 20 depends on, for example, the quality of the diffuser material of the optical control layer 44. If, for example, every ray 62 impinging on the diffuser material is diffused in a substantially Lambertian distribution, the variation of the height h1, h2, . . . , h6 may not be necessary to obtain a required confinement.

Figure 4A:
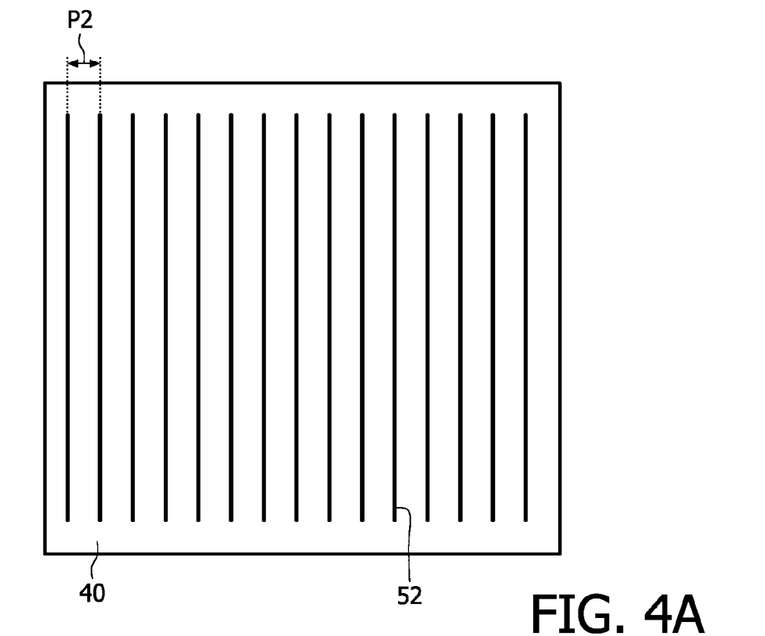
FIGS. 4A, 4B, and 4C are top views of the optical control layer in which the portions are arranged in lines arranged parallel to the optical control layer.
Figure 4B:
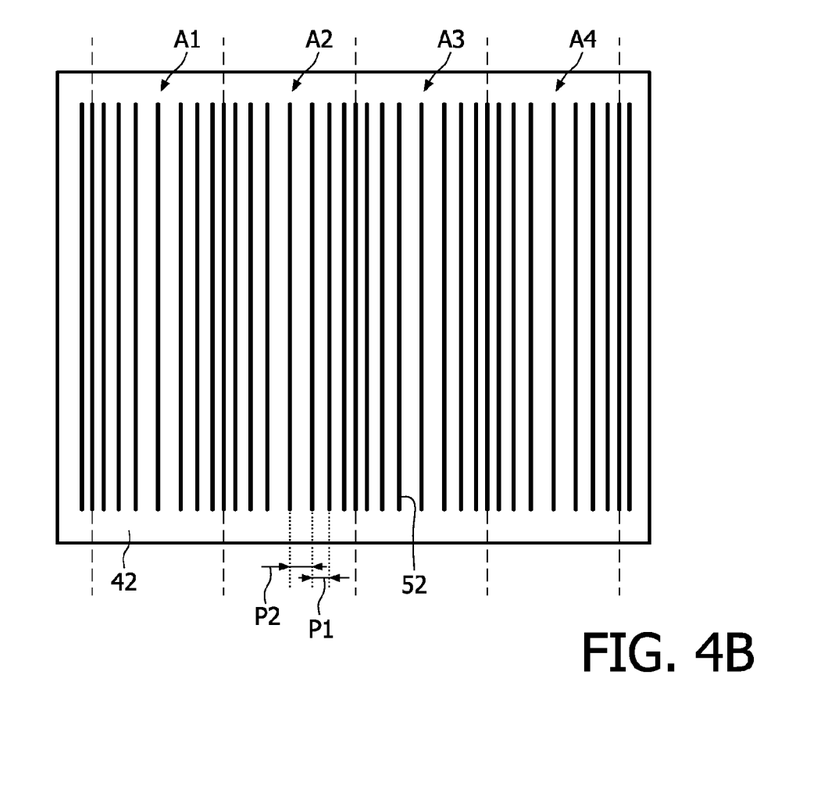
Figure 4C:
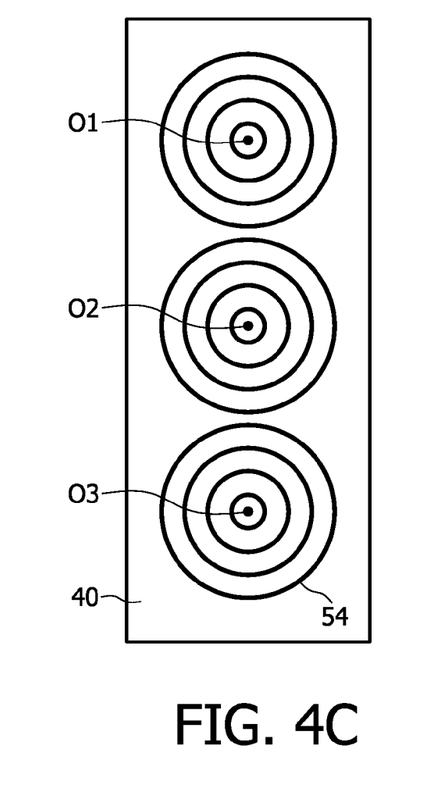

FIGS. 4A, 4B, and 4C are top views of the optical control layer 40, 41, 42, 44 in which the portions 46, 48 (see FIGS. 3A and 3B) are arranged in lines 52, 54 extending parallel to the optical control layer 40, 41, 42, 44.

FIG. 4A is a top view of the optical control layer 40 in which the portions 46, 48 (see FIGS. 1A and 3B) are arranged in substantially straight lines 52, and in which a pitch P2 between the straight lines 52 is substantially constant over the optical control layer 40. The arrangement shown has the advantage that the optical control layer 40 is relatively insensitive to translation of the optical control layer 40 in a direction parallel to the straight lines 52. This simplifies the application of the optical control layer 40 in the illumination system 30 according to the invention. Furthermore, use of a substantially constant pitch P1 between the straight lines 52 causes the optical control layer 40 to be also relatively insensitive to translations in a direction perpendicular to the straight lines 52, again simplifying the application of the optical control layer 40. The top view shown in FIG. 4A may be a top view of the embodiment of the optical control layer as shown in FIG. 2. The portions 46, 48 may be embedded in the optical control layer 40 (as shown in FIG. 2), or alternatively, the portions 46, 48 may be grooves, for example, etched into a top surface of the optical control layer 40. Also the height h1, h2, . . . , h6 (see FIGS. 3A to 3C) of the portions 46, 48 may be different at different locations of the optical control layer 40 as shown in the embodiments shown in FIGS. 3A to 3C. Alternatively, the height h1, h2, . . . , h6 of the portions 46, 48 may be substantially constant as shown in the embodiment shown in FIG. 2.

FIG. 4B is a top view of the optical control layer 42 in which the arrangement of portions 46, 48 has a reduced pitch P1 (see FIGS. 3A to 3C) near the edge of the predefined areas A1, A2, A3, A4 shown in FIGS. 3A to 3C. The reduction of the pitch P1, P2 near the edge of the predefined areas A1, A2, A3, A4 has the advantage that it allows improved control of the light near the edges of the predefined areas A1, A2, A3, A4. This enables light emitted by the light source S1, S2, S3, . . . , Sn (see FIG. 2) to substantially illuminate the predefined area A1, A2, A3, A4. The predefined area A1, A2, A3, A4 may partially overlap (not shown in FIG. 4B). Also the embodiment shown in FIG. 4B is relatively insensitive to translations parallel to the straight lines 52. Again, the portions 46, 48 may be embedded in the optical control layer 42, or they may be grooves etched into the top surface of the optical control layer 42. Also the height h1, h2, . . . , h6 of the portions 46, 48 may vary.

Alternatively, a part of the portions (not shown) may be arranged, for example, in lines extending substantially parallel to the optical control layer 42 and having a random shape (not shown), while they are substantially randomly distributed (not shown) on the optical control layer 42. These randomly shaped and distributed portions (not shown) may be used, for example, in a center of the predefined area A1, A2, A3, A4 so as to improve a uniformity of the illumination of the predefined area A1, A2, A3, A4 by the light source S1, S2, . . . , Sn.

FIG. 4C is a top view of the optical control layer 40 in which the arrangement of portions 46, 48 is configured in curved lines 54 extending substantially parallel to the optical control layer 40 and being arranged around the optical axis O1, O2, O3. This embodiment has the advantage that it enables the confinement of the light emitted by the light source in a predefined area to have substantially any shape. In the embodiment shown in FIG. 4C, the curved lines 54 are circular. Alternatively, ellipsoidal shapes may be used.

Figure 4D:
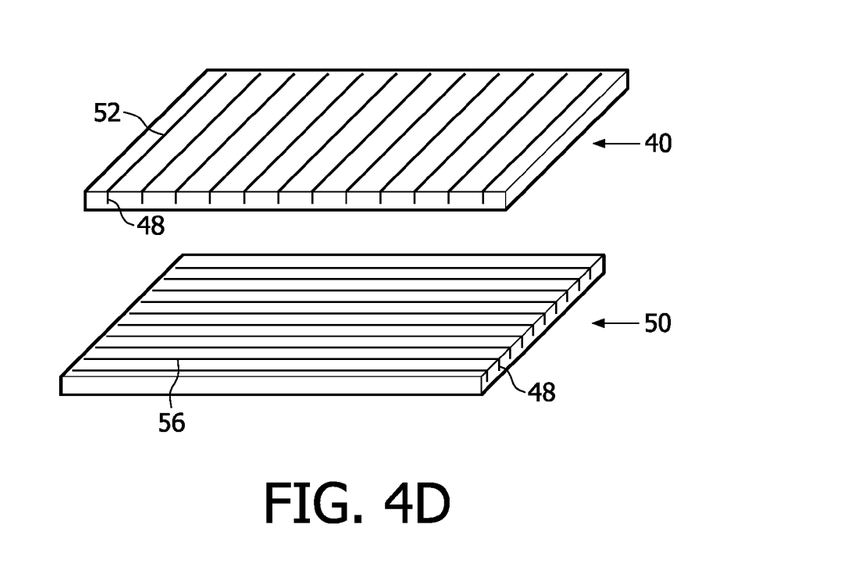
FIG. 4D is a perspective view of an arrangement of an optical control layer and a further optical control layer.

FIG. 4D is a perspective view of an arrangement of an optical control layer 40 and a further optical control layer 50. The optical control layer 40 and the further optical control layer 50 have portions 48 arranged in straight lines 52 and further lines 56. The straight lines 52 of the optical control layer 40 are arranged perpendicularly to the further lines 56 of the further optical control layer 50. Use of the optical control layer 40 and the further optical control layer 50 as shown in FIG. 4D generates a two-dimensional controllable backlight in which the stack of optical control layer 40 and further optical control layer 50 controls the light emitted by the light sources S1, S2, . . . , Sn (see FIG. 2) so as to substantially illuminate the predefined area A1, A2, A3 (see FIG. 2). Use of the optical control layer 40 and the further optical control layer allows a two-dimensional confinement of the light emitted by the light sources S1, S2, . . . , Sn. Each optical control layer 40 and further optical control layer 50 is relatively insensitive to translations parallel to the straight lines 52 and the further lines 56, respectively. Alternatively, any one of the optical control layer 40 or the further optical control layer 50 may be replaced by previously illustrated embodiments.

It should be noted that the above-mentioned embodiments illustrate rather than limit the invention, and that those skilled in the art will be able to design many alternative embodiments without departing from the scope of the appended claims.

For example, in all embodiments, the portions 46 or grooves 48 are arranged in lines 52, 54, 56, all of which are substantially arranged parallel or concentrically. However, the several lines 52, 54, 56 which consist of portions 46 or grooves 48 may also intersect. This may especially be the case when a part of the lines consisting of portions 46 or grooves 48 is distributed substantially randomly (not shown) on the optical control layer 40, 41, 42, 44.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system for illuminating a display comprising a plurality of predefined areas, the illumination system comprising:
    a light source being arranged to emit light in a diverging beam along a predefined direction towards the plurality of predefined areas of the display; and
    an optical control layer disposed between said display and said light source and comprising a plurality of portions each having a refractive index which is different from the bulk of the optical control layer and configured for limiting propagation of the diverging beam of light to a particular predefined area of the plurality of predefined areas, wherein the portions comprise walls arranged parallel to the predefined direction, and wherein at least one of heights of the portions or pitches between the portions varies over the optical control layer.

2. An illumination system as claimed in claim 1, wherein a pitch between the portions is of the same order of magnitude as or smaller than a height of the portions, the height of the portion being a dimension of the portion in a direction substantially perpendicular to the optical control layer, the pitch being defined in a direction substantially parallel to the optical control layer.

3. An illumination system as claimed in claim 1, wherein a pitch between the portions varies over the optical control layer, the pitch being defined in a direction substantially parallel to the optical control layer.

4. An illumination system as claimed in claim 1, wherein a height of the portions varies over the optical control layer, the height of the portion being a dimension of the portion in a direction substantially perpendicular to the optical control layer.

5. An illumination system as claimed in claim 1, wherein the portions comprise grooves in the optical control layer.

6. An illumination system as claimed in claim 5, wherein the grooves are generated at a side of the optical control layer facing away from the light source and/or wherein the grooves are generated at a side of the optical control layer facing the light source.

7. An illumination system as claimed in claim 1, wherein the optical control layer comprising the portions is a diffuser layer.

8. An illumination system as claimed in claim 1, wherein the portions are arranged in substantially straight lines extending substantially parallel to the optical control layer.

9. An illumination system as claimed in claim 1, wherein the portions are arranged in curved lines extending substantially parallel to the optical control layer and being arranged around the particular direction.

10. An illumination system as claimed in claim 1, wherein a part of the portions is arranged in lines extending substantially parallel to the optical control layer, the lines having a random shape, random length and/or being substantially randomly distributed on the optical control layer.

11. An illumination system as claimed in claim 8, comprising a further optical control layer having portions , the further optical control layer being arranged substantially parallel to the optical control layer, the portions being arranged in further lines extending substantially parallel to the further optical control layer and being arranged substantially perpendicularly to the lines of the optical control layer.

12. An illumination system as claimed in claim 1, comprising a plurality of light sources arranged to emit light via the optical control layer towards the display, each particular light source being arranged to illuminate a particular predefined area on the display, wherein the optical control layer comprises an arrangement of portions for reflecting part of the diverging light of each particular light source back towards the corresponding particular predefined area.

13. An illumination system as claimed in claim 12, wherein each particular light source in the plurality of light sources comprises a light-emitting diode , or a low-pressure vapor discharge lamp, or a laser light source.

14. An illumination system as claimed in claim 1, wherein the particular direction corresponds to an optical axis of the light source.

* * * * *